(12) United States Patent
Sharer

(10) Patent No.: US 7,219,858 B2
(45) Date of Patent: May 22, 2007

(54) METHOD FOR DEPLOYING MULTIPLE SPACECRAFT

(75) Inventor: Peter J. Sharer, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 260 days.

(21) Appl. No.: 10/884,901

(22) Filed: Jul. 6, 2004

(65) Prior Publication Data

US 2006/0016934 A1    Jan. 26, 2006

(51) Int. Cl.
*B64G 1/10*    (2006.01)

(52) U.S. Cl. .............................. 244/158.4; 244/158.5; 244/158.6

(58) Field of Classification Search ............. 244/158.4, 244/158.5, 158.6, 158.7, 158.8, 172.4, 172.5
See application file for complete search history.

(56) References Cited

U.S. PATENT DOCUMENTS

| | | | |
|---|---|---|---|
| 5,158,249 A | | 10/1992 | Uphoff |
| 5,397,082 A | * | 3/1995 | Scott ........................ 244/158.4 |
| 5,507,454 A | | 4/1996 | Dulck |
| 5,765,784 A | * | 6/1998 | Lapins .................... 244/173.3 |
| 6,059,233 A | | 5/2000 | Koppel et al. |
| 6,059,235 A | | 5/2000 | Messinger et al. |
| 6,616,545 B2 | | 9/2000 | Salvatore et al. |
| 6,149,103 A | | 11/2000 | Salvatore et al. |
| 6,302,354 B1 | | 10/2001 | Patera |
| 6,341,250 B1 | | 1/2002 | Belbruno |

OTHER PUBLICATIONS

Article: Kristi Marren, Lab Cranks Up STEREO Development, May 2002, The Johns Hopkins University,The Applied Physics Laboratory News.*
Davila, J.M.; Rust, D.M.; Sharer, P.J., The Solar Terrestrial Relations Observatory—Mission Overview, American Astronomical Society, vol. 32, p. 1291, Published Oct. 2000.*

* cited by examiner

*Primary Examiner*—Michelle Clement
*Assistant Examiner*—Benjamin P. Lee
(74) *Attorney, Agent, or Firm*—Albert J. Fasulo, II

(57) ABSTRACT

A method for deploying multiple spacecraft is disclosed. The method can be used in a situation where a first celestial body is being orbited by a second celestial body. The spacecraft are loaded onto a single spaceship that contains the multiple spacecraft and the spacecraft is launched from the second celestial body towards a third celestial body. The spacecraft are separated from each other while in route to the third celestial body. Each of the spacecraft is then subjected to the gravitational field of the third celestial body and each of the spacecraft assumes a different, independent orbit about the first celestial body. In those situations where the spacecraft are launched from Earth, the Sun can act as the first celestial body, the Earth can act as the second celestial body and the Moon can act as the third celestial body.

12 Claims, 16 Drawing Sheets

| Event | Date | Description |
|---|---|---|
| Launch | 2005 15-Nov | 02:18:29 UTC |
| A1 | 22-Nov | 7.1 days, 76 Re |
| P1 | 29-Nov | 14.2 days, 1.18 Re |
| A2 | 6-Dec | 21.3 days, 76 Re |
| P2 | 13-Dec | 28.4 days, 1.46 Re |
| A3 | 19-Dec | 34.2 days, 66 Re |
| P3 | 25-Dec | 40.1 days, 1.68 Re |
| A4 | 31-Dec | 45.9 days, 67 Re |
| P4 | 2006 5-Jan | 51.9 days, 2.10 Re |
| S1 | 9-Jan | 55.2 days Ahead = 13,308 km Behind = 8,787 km |
| A5 | 13-Jan | 73.3 days, 139 Re |
| S2 | 9-Feb | 92.6 days Behind = 20,307 km |

Figure 19

METHOD FOR DEPLOYING MULTIPLE SPACECRAFT

STATEMENT OF GOVERNMENT INTEREST

This invention was made with Government support under Contract Number NAS5-97271 awarded by NASA. The Government may have certain rights in this invention.

CROSS REFERENCE TO RELATED APPLICATIONS

This application is related to U.S. Provisional Patent Application No. 60/333,826, filed on Nov. 20, 2001, and U.S. Provisional Patent Application No. 60/434,739, filed on Dec. 19, 2002. Both of those Provisional Patent Applications are hereby incorporated by reference in their entirety.

BACKGROUND OF THE INVENTION

1. Field of the Invention

This invention relates to a method for deploying spacecraft, and more particularly, to a method for deploying multiple spacecraft.

2. Related Art

Spacecraft are launched and deployed to various locations to serve a variety of different purposes. Different techniques can be used place these spacecraft in their desired orbits. One technique that can be used is a lunar fly-by maneuver.

Salvatore et al. (U.S. Pat. No. 6,116,545) discloses a method using a lunar fly-by maneuver to transfer a satellite from a quasi-geosynchronous transfer orbit to a geosynchronous orbit. Salvatore teaches the use of three stages, including a second translunar injection at perigee to escape the final intermediate phasing orbit of the earth.

Salvatore et al. (U.S. Pat. No. 6,149,103) teaches the use of at least two lunar fly-by maneuvers to transfer a satellite from a quasi-geosynchronous transfer orbit having a high inclination to a final geosynchronous orbit having a low inclination.

Dulck (U.S. Pat. No. 5,507,454) teaches the use of gravitational assistance to place probes in heliocentric orbits in planes outside the plane of the elliptic plane.

Koppel et al. (U.S. Pat. No. 6,059,233) teaches the concept of placing two satellites on a launcher. The first satellite is placed directly by the launcher and the second satellite is placed in a lunar transfer orbit.

Uphoff (U.S. Pat. No. 5,158,249) teaches the concept of a lunar swing by maneuver and using the moon's gravitational field to achieve orbital transfers.

Meissinger et al. (U.S. Pat. No. 6,059,235) teaches a step of applying an additional velocity impulse to a spacecraft by an intermediate target to assist the spacecraft in reaching a distant target planet.

The related art generally employs lunar flyby maneuvers and lunar gravity assist to establish geosynchronous orbits for satellites. This means that the satellites eventually orbit the earth after completing a lunar flyby maneuver. While these mission designs include a lunar flyby maneuver, none of these references disclose the concept of using lunar gravity assist to deploy a constellation of spacecraft about a celestial body different than the celestial body where the spacecraft originated.

SUMMARY OF THE INVENTION

A method for deploying a plurality of spacecraft in an orbit about different celestial body than the celestial body where the spacecraft originated is disclosed. The term "spacecraft" as used throughout the specification and claims refers to any moving vehicle that is capable of moving through space and can carry one or more of the following systems: power, propulsion, signaling and/or communications, and is powered by any form of energy. In some cases, the spacecraft can be a satellite.

In one aspect, the invention provides a method for deploying multiple spacecraft about a first celestial body comprising the steps of: storing a first spacecraft and a second spacecraft aboard a spaceship; launching the spaceship from a second celestial body different than the first celestial body; flying the spaceship to a third celestial body; separating the first spacecraft and the second spacecraft from the spaceship while the spaceship is traveling towards the third celestial body from the second celestial body; separating the first spacecraft from the second spacecraft while the spaceship is traveling towards the third celestial body from the second celestial body; establishing a first trajectory for the first spacecraft and establishing a second trajectory for the second spacecraft, wherein the first trajectory is different than the second trajectory; subjecting the first spacecraft to a gravitational force of the third celestial body whereby the first trajectory of the first spacecraft is modified and the first spacecraft assumes a first orbit about the first celestial body; subjecting the second spacecraft to the gravitational force of the third celestial body whereby the second trajectory of the second spacecraft is modified and the second spacecraft assumes a second orbit about the first celestial body; and where the first orbit is different than the second orbit.

In another aspect, the invention provides a step of separating a third spacecraft from the second spacecraft.

In another aspect, the invention provides a step of separating an Nth spacecraft from the third spacecraft.

In another aspect, the invention provides a step of subjecting at least one of the spacecraft to the gravitational field of the third celestial body a second time.

In another aspect, the first orbit is circumferentially ahead of an orbit of the second celestial body.

In another aspect, the second orbit is circumferentially behind an orbit of the second celestial body.

In another aspect, an N number of spacecraft are stored aboard the spaceship.

In another aspect, the invention provides a method for deploying a plurality of spacecraft about a first celestial body comprising the steps of: storing a first spacecraft and a second spacecraft aboard a single spaceship; launching the spaceship from a second celestial body different than the first celestial body; flying the spaceship to a third celestial body; separating the first spacecraft and the second spacecraft from the spaceship while the spaceship is traveling towards the third celestial body from the second celestial body; separating the first spacecraft from the second spacecraft while the spaceship is traveling towards the third celestial body from the second celestial body; subjecting the first spacecraft to a gravitational force of the third celestial body whereby the first spacecraft assumes a first orbit about the first celestial body; subjecting the second spacecraft to the gravitational force of the third celestial body whereby the second spacecraft assumes a second orbit about the first celestial body; and wherein the first orbit is circumferentially ahead of the second celestial body and wherein the second orbit is circumferentially behind the second celestial body.

In another aspect, the invention provides a method of deploying a plurality of satellites from Earth, the Earth orbiting a Sun in a first heliocentric orbit about the Sun and the Earth moving in a first circumferential direction with respect to the Sun, comprising the steps of: storing a first spacecraft and a second spacecraft in a single spaceship; launching the spaceship containing the first satellite and the second satellite and directing the spaceship to a Moon of the Earth; separating the first spacecraft from the second spacecraft so that the first spacecraft assumes a first trajectory and the second spacecraft assumes a second trajectory; the first trajectory being different than the second trajectory; subjecting the first spacecraft to a gravitational field of the moon, the gravitational field changing the first trajectory and sending the first spacecraft to a second heliocentric orbit; subjecting the second spacecraft to the gravitational field of the moon, the gravitational field changing the second trajectory and sending the second spacecraft to a third heliocentric orbit; and wherein the second heliocentric orbit is different than the first heliocentric orbit and wherein the second heliocentric orbit is different than the third heliocentric orbit.

In another aspect, the first spacecraft from the second spacecraft travel towards the Moon as a separated pair of spacecraft.

In another aspect, the second heliocentric orbit is ahead of the Earth.

In another aspect, the third heliocentric orbit is behind the Earth.

In another aspect, the first spacecraft and the second spacecraft are disposed on opposite sides of the Earth.

In another aspect, the angular displacement of the first spacecraft from the Earth is approximately equal to the angular displacement of the second spacecraft from the Earth.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 19 is a table of a preferred embodiment of a mission plan.

DETAILED DESCRIPTION OF THE PREFERRED EMBODIMENT(S)

Figure 1:
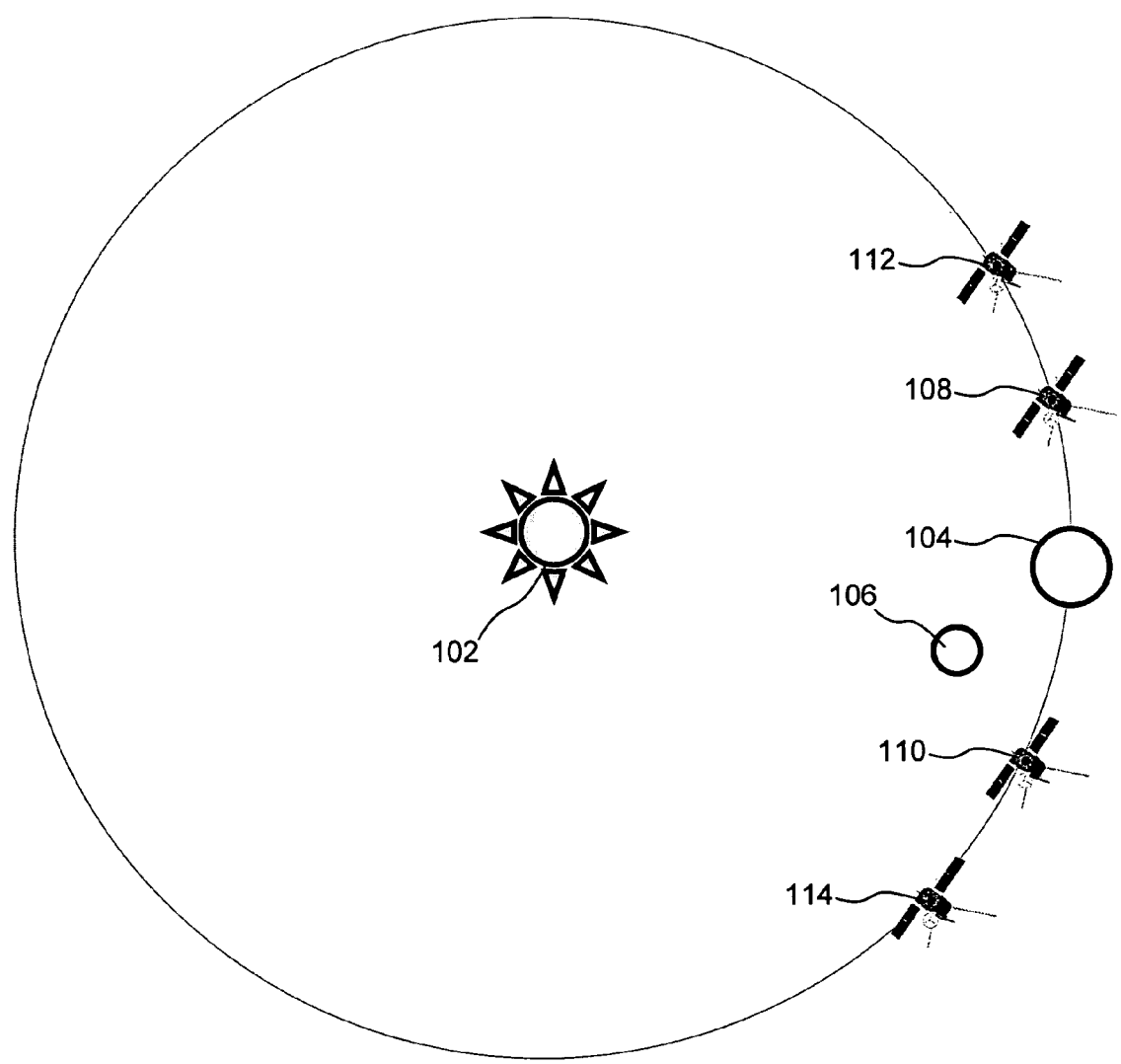
FIG. 1 is a schematic diagram of a preferred embodiment of a plurality of celestial bodies and spacecraft.

FIG. 1 is a schematic diagram of a preferred embodiment of a plurality of celestial bodies and a plurality of spacecraft. FIG. 1 includes first celestial body 102, second celestial body 104 and third celestial body 106. As shown in FIG. 1, second celestial body 104 orbits around first celestial body 102. Also, in this embodiment, third celestial body 106 is a natural satellite of second celestial body 104 and third celestial body 106 orbits or rotates about second celestial body 104.

FIG. 1 also includes a plurality of spacecraft, first spacecraft 108, second spacecraft 110, third spacecraft 112 and Nth spacecraft 114. Principles, features and teachings of the present invention can be applied to any number of spacecraft. For clarity and convenience, an Nth spacecraft 114 is used to denote any additional, multiple spacecraft. It can be observed in FIG. 1 that these spacecraft are disposed in an orbit about first celestial body 102. Principles of the present invention can be used to deploy a constellation of spacecraft from second celestial body 104 that eventually achieve an orbit about first celestial body 102.

Figure 2:
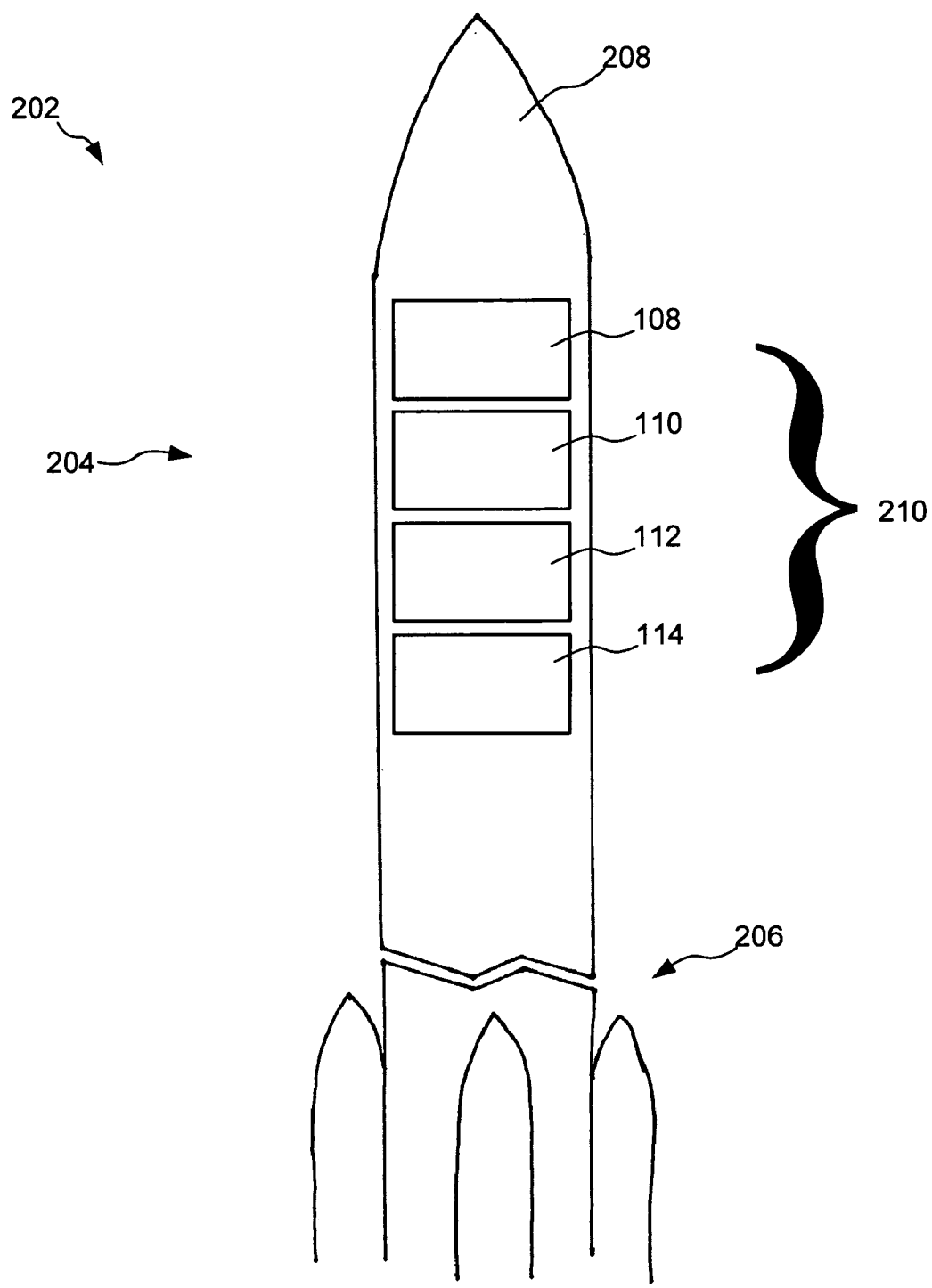
FIG. 2 is a schematic diagram of a preferred embodiment of a spaceship.

Preferably, a single launch vehicle or spaceship is used to deploy the plurality of spacecraft 108, 110, 112 and 114 shown in FIG. 1. Referring to FIG. 2, which is a schematic diagram of a preferred embodiment of a spaceship 202, spaceship 202 is preferably a rocket type spaceship and includes the following components. Spaceship 202 includes nose cone 208, payload portion 204 and booster portion 206.

Payload portion 204 includes a payload package 210. Payload package 210 is comprised of first spacecraft 108, second spacecraft 110, third spacecraft 112 and Nth spacecraft 114. Payload package 210 can also include support equipment for the spacecraft and can also include separation equipment for the spacecraft. In some embodiments, payload package 210 can include a maneuvering thruster.

Booster portion 206 can include one or more stages and in some embodiments, booster portion 206 can be discarded or separated from payload package 210 sometime during flight. Similarly, nose cone 208 can also be discarded or separated from payload package 210 during flight.

Figure 3:
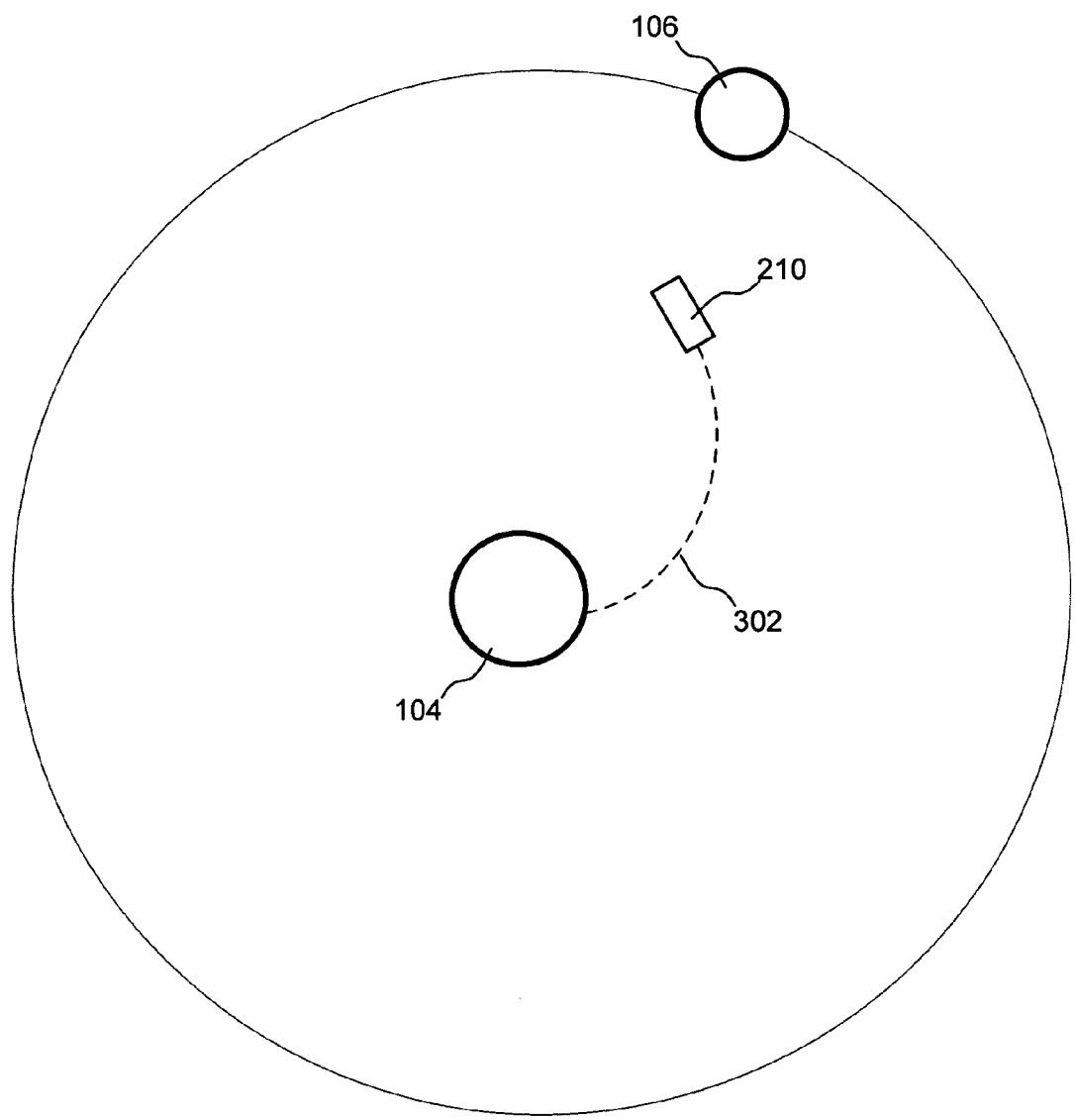
FIG. 3 is a schematic diagram of a preferred embodiment of a payload package traveling between two celestial bodies.

FIG. 3 is a schematic diagram of second celestial body 104 and third celestial body 106. FIG. 3 shows flight path 302 of payload package 210 after booster portion 206 and nose cone 208 have been separated from payload package 210. Preferably, the separation of payload package 210 from booster portion 206 and nose cone 208 occurs while spaceship 202 is flying from second celestial body 104 to third celestial body 106 and before spaceship 202 reaches third celestial body 106.

Figure 4:
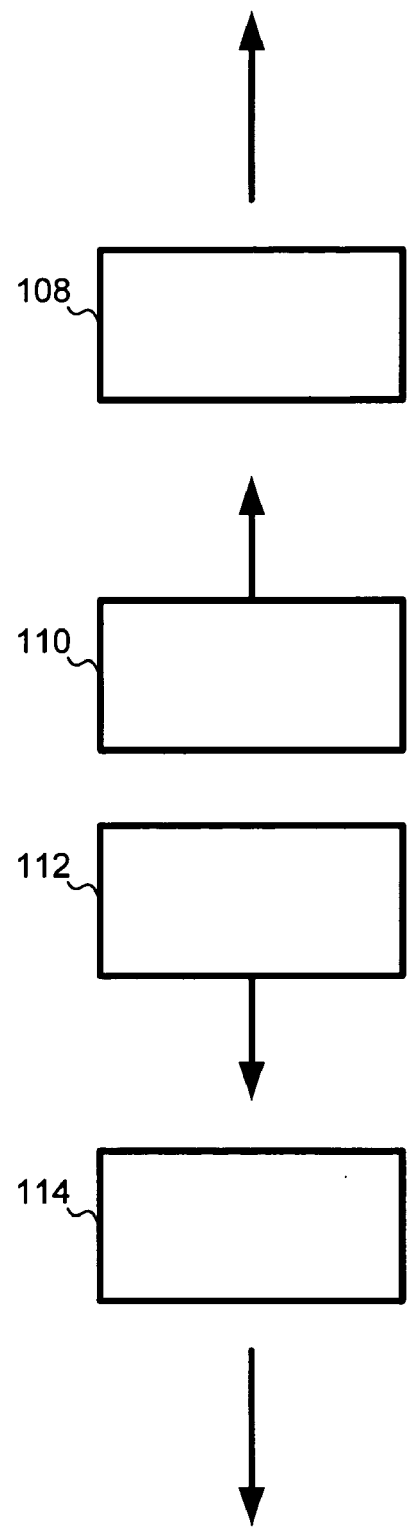
FIG. 4 is a schematic diagram of a preferred embodiment of a separation between spacecraft.

Also, during the flight from second celestial body 104 to third celestial body 106, the plurality of spacecraft separate from one another. This step is shown in FIG. 4, which is a schematic diagram of a plurality of spacecraft. The plurality of spacecraft can separate in any desired configuration and in any desired order. In the embodiment shown in FIG. 4, first spacecraft 108 and Nth spacecraft 114 separate first and then second spacecraft 110 separates from third spacecraft 112. But any order or sequence of separation can be used.

The separation order is arbitrary and any separation sequence can be used. In some embodiments, it is possible to separate first spacecraft 108 from second spacecraft 110, and then separate second spacecraft 110 spaceship 202.

The separation sequence from spaceship 202 is generally governed by the spaceship accommodations. For the embodiment disclosed above, the spacecraft are stacked. If the spacecraft accommodations were different, both spacecraft could be attached to the spaceship in a side-by-side configuration. In this case, both spacecraft would separate from the spaceship. This separation could be done simultaneously or sequentially.

After separation, each of the spacecraft preferably assumes a trajectory that is different from the other spacecraft. In the embodiment shown in FIG. 4, first spacecraft 108 assumes a first trajectory, second spacecraft 110 assumes a second trajectory, third space craft 112 assumes a third trajectory and Nth spacecraft 114 assumes an Nth trajectory.

Figure 5:
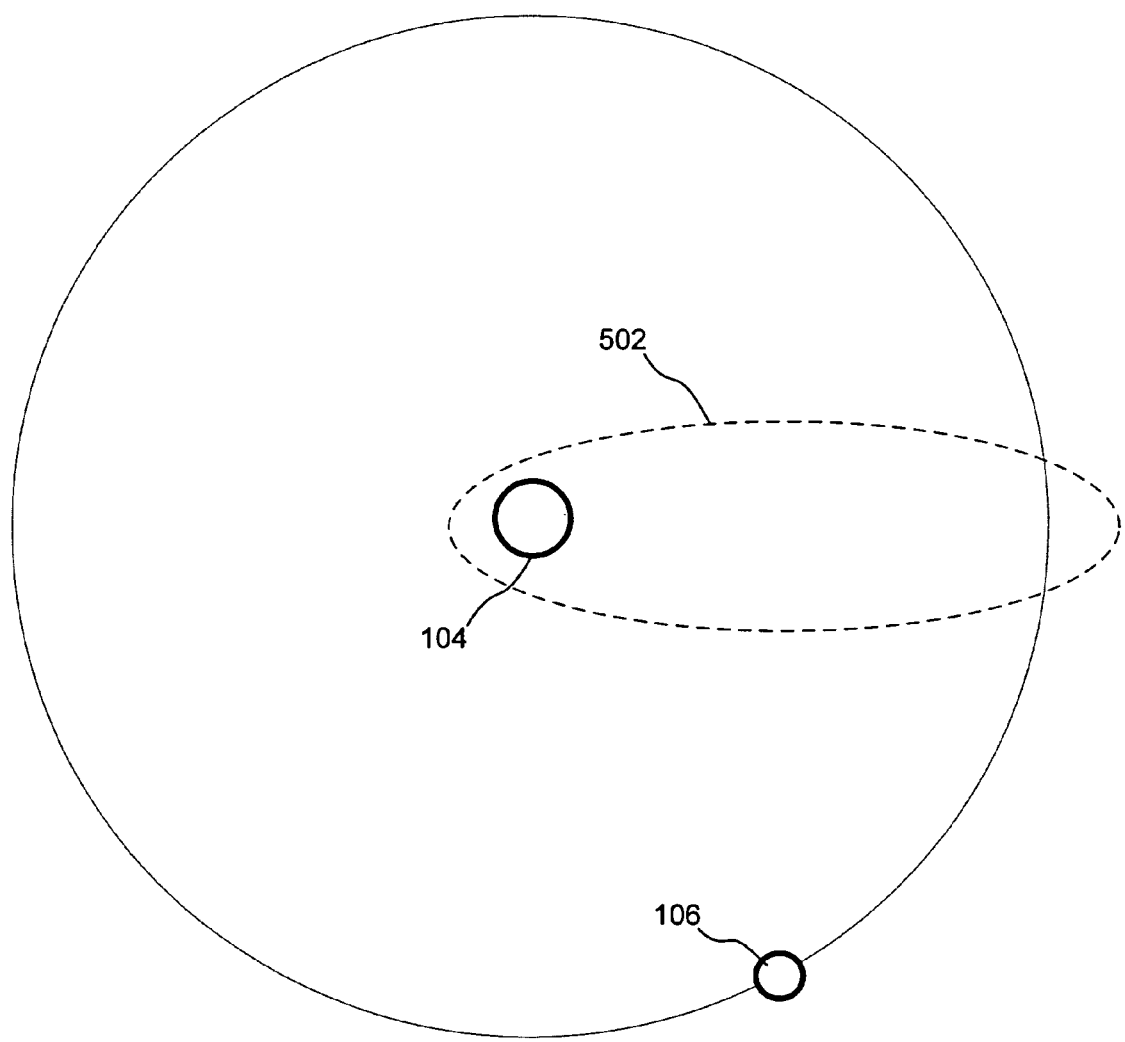
FIG. 5 is a schematic diagram of a preferred embodiment of an orbit of a payload package.

Although the spacecraft have different trajectories, all of the separated spacecraft 108, 110, 112 and 114, preferably enter an orbit 502 (See FIG. 5) about second celestial body 104 after separation. Preferably, this orbit 502 comes in relatively close proximity to the orbit 504 of third celestial body 106.

Some embodiments, one or more of the plurality of spacecraft 108, 110, 112 and/or 114 are subjected to the gravitational force of third celestial body 106. In a preferred embodiment, all of the spacecraft 108, 110, 112 and 114 are subjected to the gravitational field of third celestial body 106 at least one time. Preferably, the different trajectories previously assumed by the different spacecraft influence or affect the initial trajectories of the spacecraft. An embodiment of this phenomenon is shown in FIG. 6.

Figure 6:
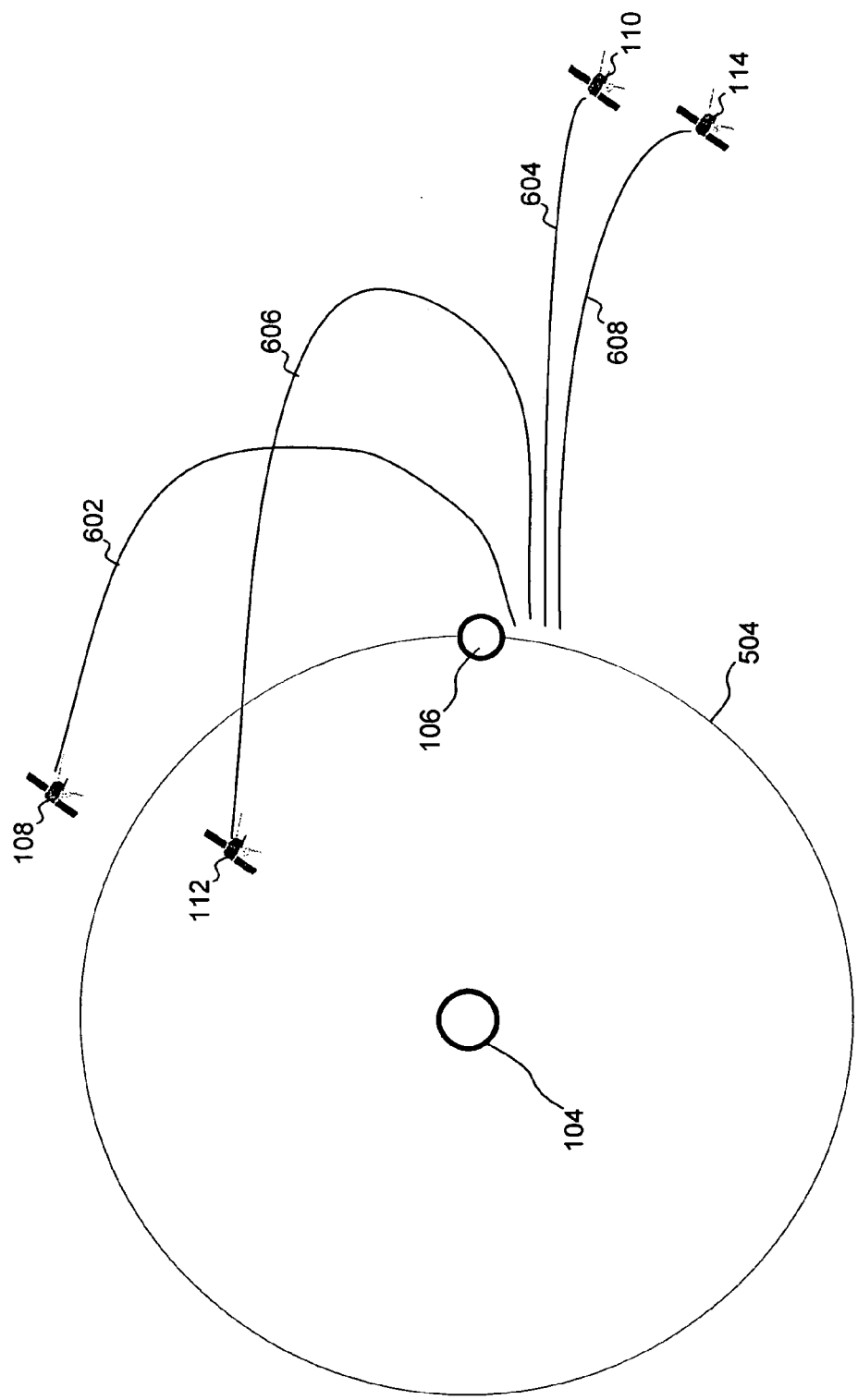
FIG. 6 is a schematic diagram of a preferred embodiment of modified trajectories.

Referring to FIG. 6, which is a schematic diagram of an embodiment including modified trajectories, the influence of the gravitational field of third celestial body 106 on the various spacecraft 108, 110, 112 and 114 can be observed. Because each of the spacecraft 108, 110, 112 and 114 have different initial trajectories, initial meaning prior to their first encounter or fly-by of third celestial body 106, the gravitational field of third celestial body 106 will affect or influence the trajectories of the various spacecraft in different ways.

In the embodiment shown in FIG. 6, first spacecraft 108 assumes a modified trajectory of first spacecraft 602 after conducting its fly-by of third celestial body 106. Second spacecraft 110 assumes a modified trajectory of second spacecraft 604 after conducting its fly-by of third celestial body 106. Third spacecraft 112 assumes a modified trajectory of second spacecraft 606 after conducting its fly-by of third celestial body 106. Nth spacecraft 114 assumes a modified trajectory of Nth spacecraft 608 after conducting its fly-by of third celestial body 106.

In the embodiment shown in FIG. 6, each of the spacecraft conducts a fly-by maneuver of third celestial body 106 and each of the spacecraft assumes a modified trajectory after conducting the fly-by. Preferably each of the modified trajectories is different from the other modified trajectories and each of the spacecraft are sent in different directions. It can also be observed that some spacecraft can leave the orbit 502 (see FIG. 5) of second celestial body 104 and assume a different orbit.

Figure 7:
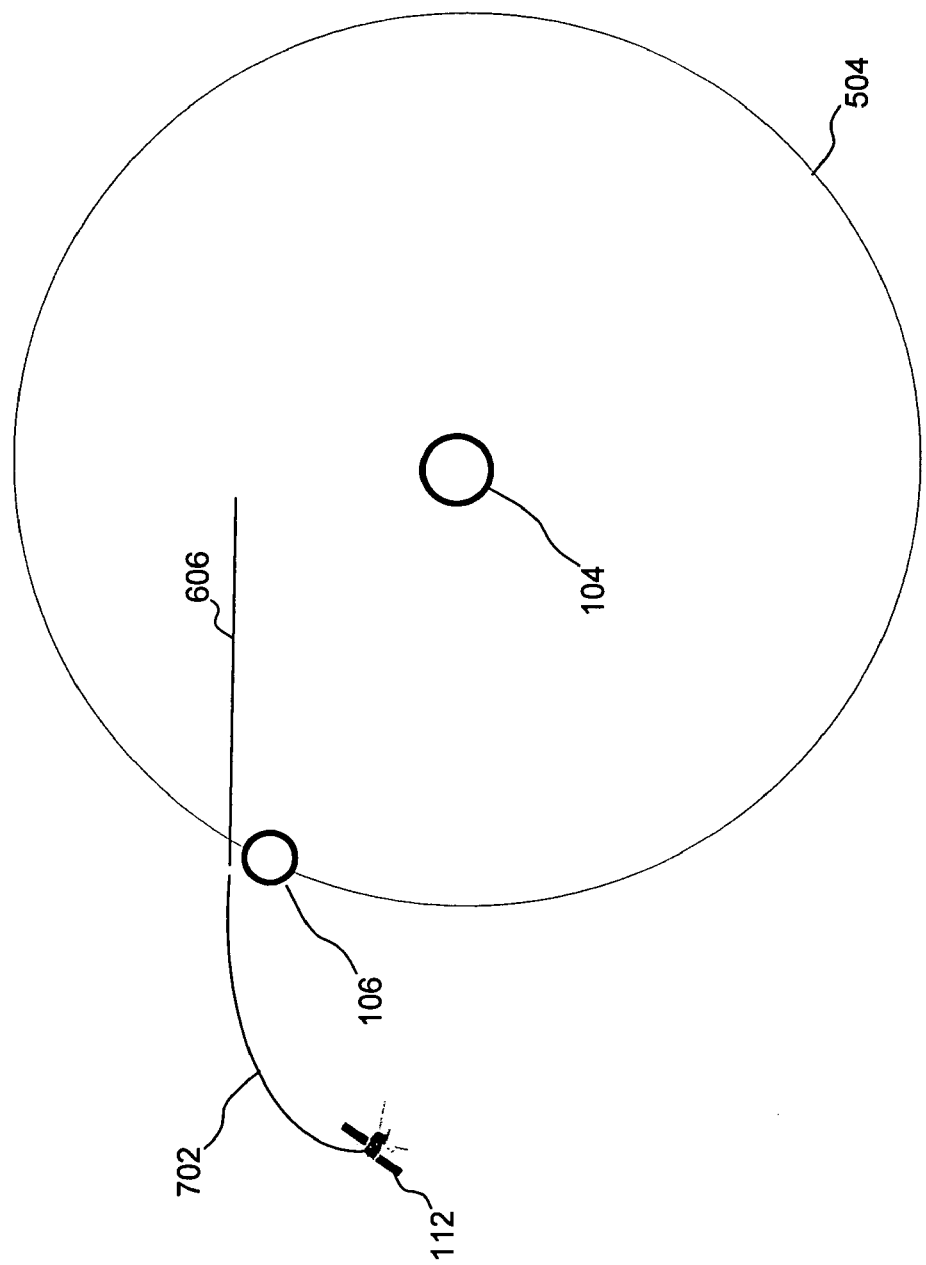
FIG. 7 is a schematic diagram of a preferred embodiment of a second modified trajectory.

In some embodiments, one or more of the spacecraft are subjected to the gravitational field of third celestial body 106 a second time. Referring to FIG. 7, third spacecraft 112 assumed a modified trajectory of the third spacecraft 608 after encountering the gravitational field of third celestial body 106. In the embodiment shown in FIG. 7, third spacecraft 112 is subjected to the gravitational field of third celestial body 106 a second time. After the second fly-by of third celestial body 106, third spacecraft 112 assumes a second modified trajectory 702.

While the embodiment shown in FIG. 7 shows third spacecraft 112 encountering the gravitational field of third celestial body 106, other spacecraft could also be subjected to the gravitational field of third celestial body 106 if desired. In some embodiments, one or more of the spacecraft are subjected to the gravitational field of third celestial body 106 a third time. In fact, any of the spacecraft can be subjected to the gravitational field of third celestial body 106 any number of times, as needed for a particular mission or deployment array.

Preferably, the spacecraft are subjected to the gravitational field of third celestial body 106 a selected number of times and in certain ways so that a constellation of spacecraft are arrayed about first celestial body 102 as shown in FIG. 1. In the embodiment shown in FIG. 1, the spacecraft are launched or originate from second celestial body 104. This means that principles of the present invention can be used to deploy a constellation of spacecraft about a celestial body different than the celestial body where the spacecraft originated.

FIG. 1 is a schematic diagram of a preferred embodiment of a plurality of celestial bodies and a plurality of spacecraft. FIG. 1 includes first celestial body 102, second celestial body 104 and third celestial body 106. As shown in FIG. 1, second celestial body 104 orbits around first celestial body 102. Also, in this embodiment, third celestial body 106 is a natural satellite of second celestial body 104 and third celestial body 106 orbits or rotates about second celestial body 104.

FIGS. 8 to 21 illustrate a preferred embodiment of the present invention. In this embodiment, a constellation of spacecraft launched from Earth 804 use one or more fly-by maneuvers of the Moon 806 to achieve an orbit about the Sun 802. In this embodiment, a pair of spacecraft, ahead spacecraft 808 and behind spacecraft 810, comprise the constellation of spacecraft that are deployed about the Sun 802. Orbits about the Sun 802 can be referred to as heliocentric orbits, and in this embodiment, ahead spacecraft 808 and behind spacecraft 810 preferably assume heliocentric orbits.

While principles, features and teachings of the present invention can be applied to any number of spacecraft, this embodiment only includes two. It can be observed in FIG. 8 that these spacecraft are disposed in an orbit about the Sun 802. Principles of the present invention can be used to deploy a constellation of spacecraft about the Sun 802 that are launched from the Earth 804.

Figure 9:
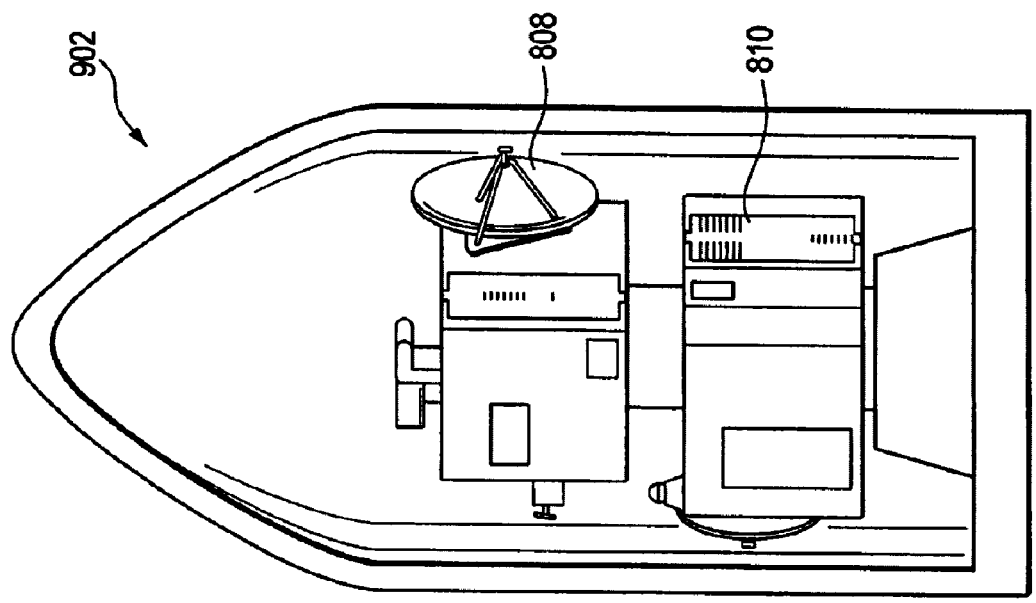
FIG. 9 is a schematic diagram of a preferred embodiment of a spaceship.
Figure 8:
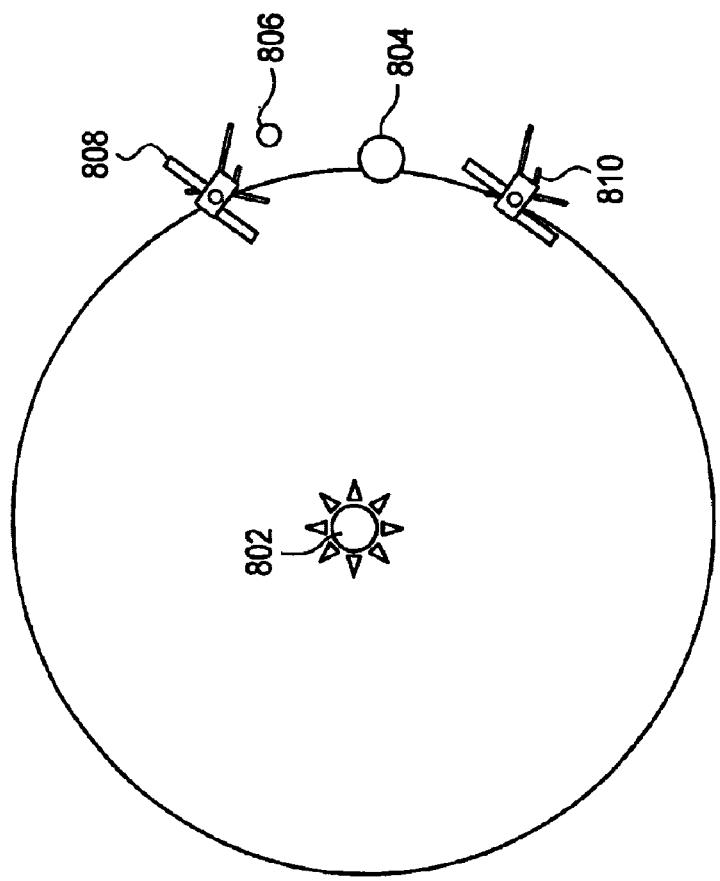
FIG. 8 is a schematic diagram of a preferred embodiment of a plurality of spacecraft disposed about the Sun.

Preferably, a single launch vehicle or spaceship is used to deploy both ahead spacecraft 808 and behind spacecraft 810. Referring to FIG. 9, which is a schematic diagram of a preferred embodiment of a spaceship 902, spaceship 902 is preferably a rocket type spaceship. Both spacecraft are preferably loaded onto spaceship 902. In other words, spaceship 902 contains both spacecraft. Although any suitable spaceship can be used, in one embodiment, the Delta-II (7925-10L) launch vehicle is used.

As shown in FIG. 9, it is preferred that the two spacecraft are arranged in tandem, one on top of the other, in spaceship 902. The two spacecraft are also preferably releaseably attached to one another. In some embodiments, booster stage is disposed below the two spacecraft. In the preferred embodiment, ahead spacecraft 808 is on top. But the specific packing configuration does not matter. If the spacecraft accommodations were different they could be attached side-by-side or event side-by-side stacks if many small spacecraft were to be launched.

Figure 10:
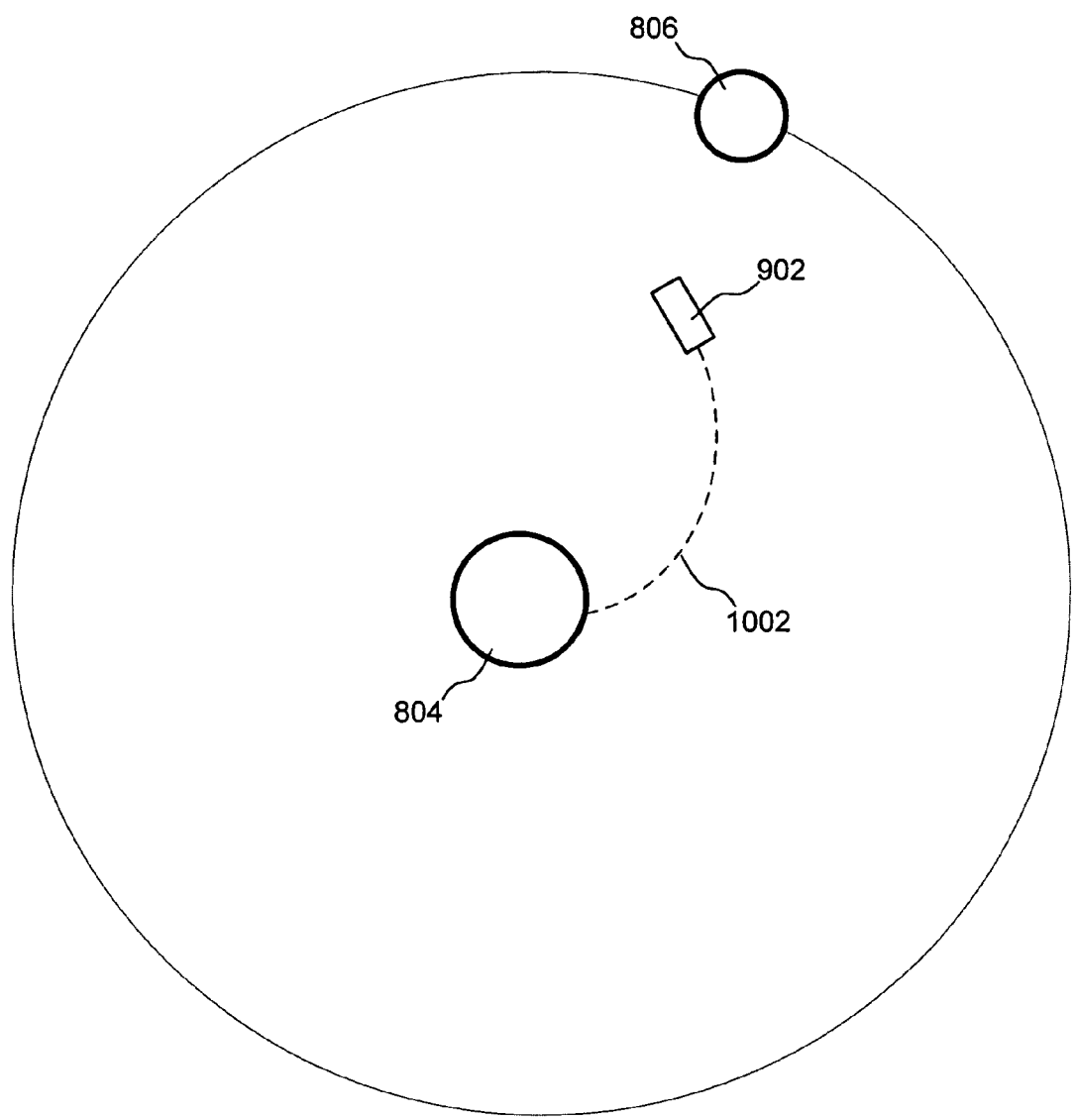
FIG. 10 is a schematic diagram of a preferred embodiment of a spaceship traveling from the Earth to the Moon.

FIG. 10 is a schematic diagram of Earth 804 and Moon 806. FIG. 10 shows flight path 1002 of spaceship 902. Preferably, at some point when spaceship 902 is traveling from the Earth 804 to the Moon 806, various components are separated from the spacecraft 808 and 810.

Figure 11:
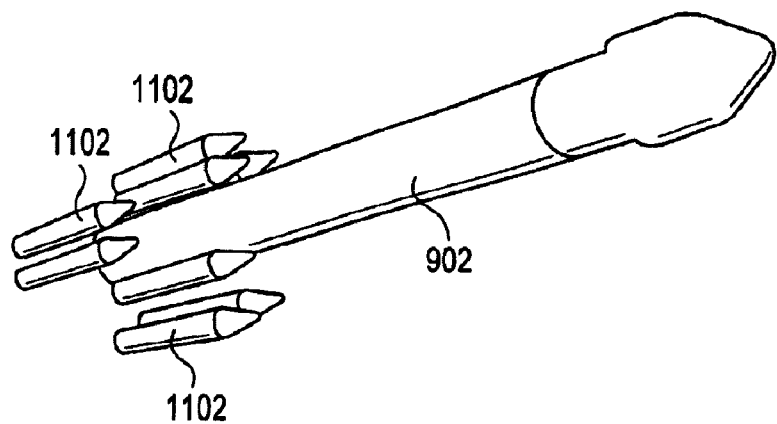
FIG. 11 is a schematic diagram of a preferred embodiment of a separation.

FIGS. 11 to 17 show preferred embodiments of the various separations that occur during this phase. The first separation is shown in FIG. 11. At this point, first boosters 1102 are separated from spaceship 902. Preferably, this first separation occurs shortly after take off. In an exemplary embodiment, this separation occurs about 270 seconds after take off.

Figure 12:
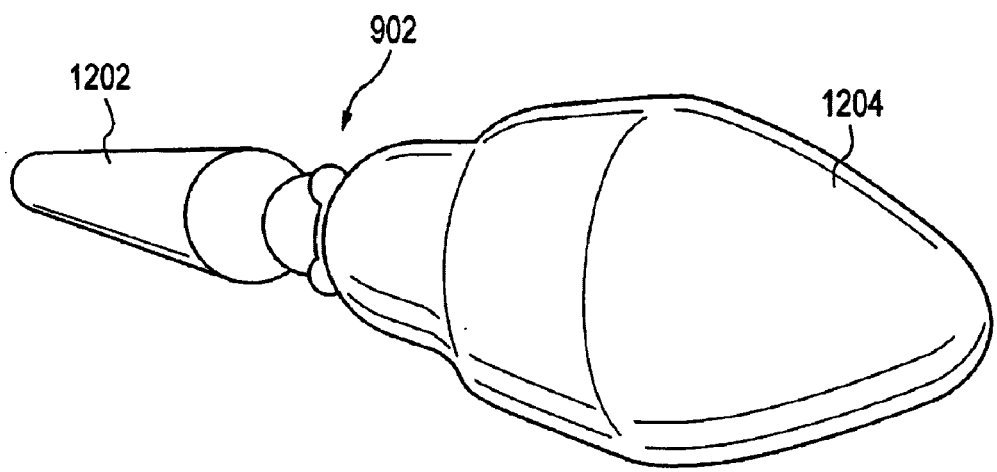
FIG. 12 is a schematic diagram of a preferred embodiment of a separation.

FIG. 12 shows the second separation. In this step, second booster 1202 is separated from forward portion 1204. Forward portion 1204 contains ahead spacecraft 808 (not visible in FIG. 12) and behind spacecraft 810 (not visible in FIG. 12).

Figure 13:
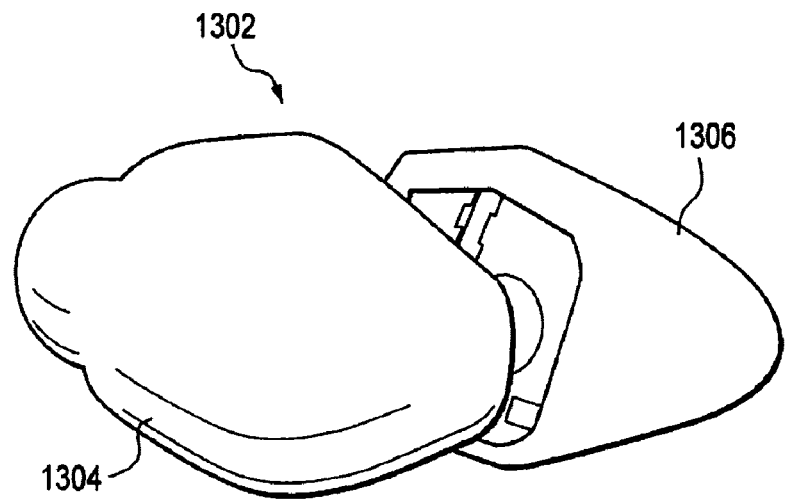
FIG. 13 is a schematic diagram of a preferred embodiment of a separation.
Figure 14:
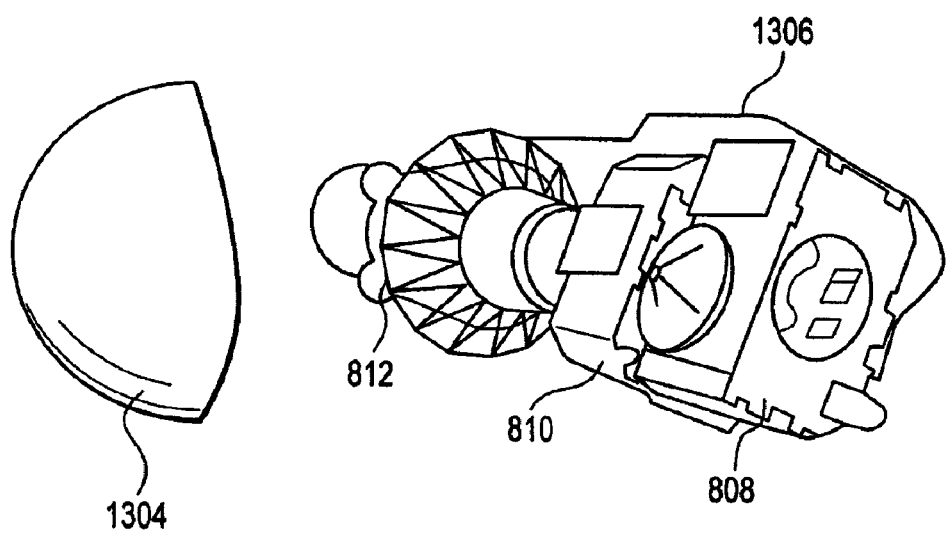
FIG. 14 is a schematic diagram of a preferred embodiment of a separation.

After second booster 1202 is separated from forward portion 1204, fairing 1302 is removed. This step is shown in FIG. 13. Fairing 1302 preferably comprises two halves, a first fairing half 1304 and a second fairing half 1306. The two fairing halves 1304 and 1306 enclose ahead spacecraft 808 and behind spacecraft 810 and are disposed on opposite sides of the two spacecraft. The two fairing halves 1304 and 1306 separate from each other and separate from the two spacecraft by falling away, as shown in FIGS. 13 and 14.

Figure 15:
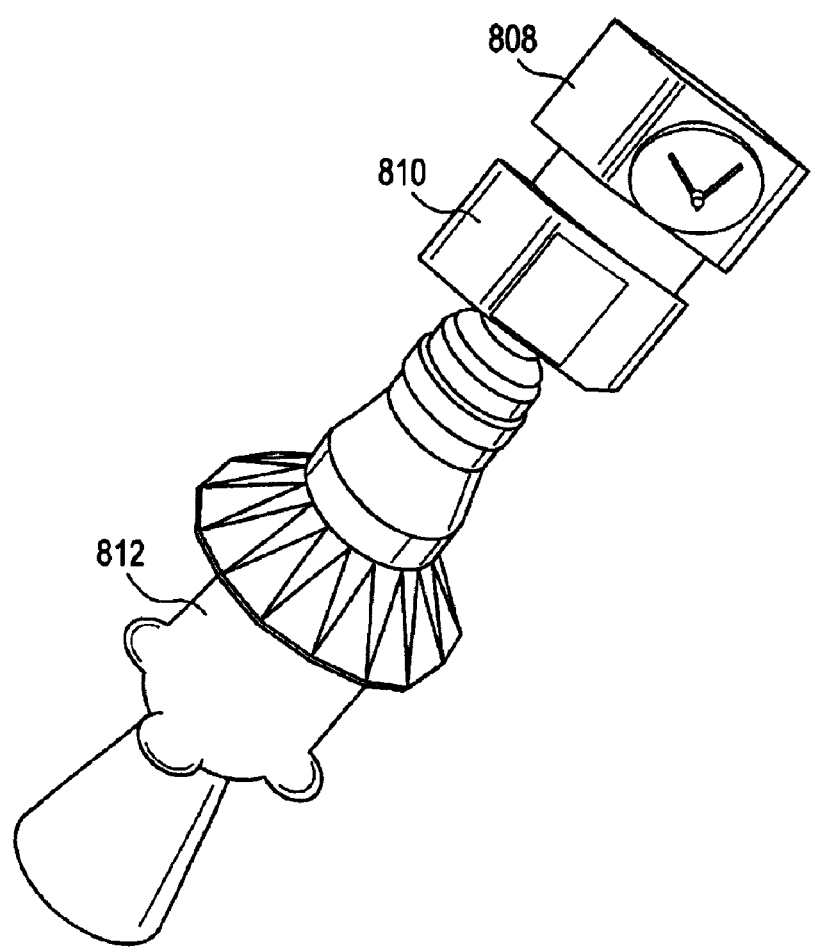
FIG. 15 is a schematic diagram of a preferred embodiment of a pair of spacecraft and a final booster.

At this stage, all exterior portions of spaceship 902 (see FIG. 11) have been separated from ahead spacecraft 808 and behind spacecraft 810. A preferred embodiment of this configuration is shown in FIG. 15. Final booster 812, which was previously disposed within fairing 1303 (see FIGS. 13 and 14) remains connected to behind spacecraft 810.

Figure 16:
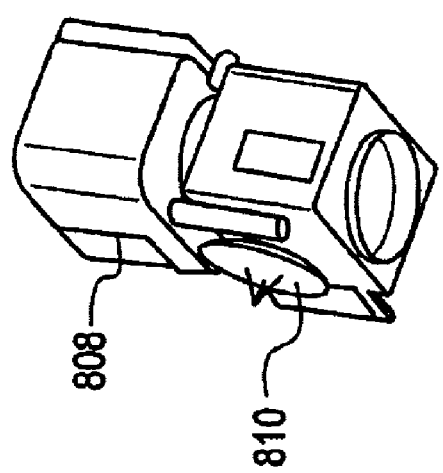
FIG. 16 is a schematic diagram of a preferred embodiment of a pair of connected spacecraft.

Eventually, final booster 812 is fired and consumed. After final booster 812 has been employed, that too is separated from the two spacecraft 808 and 810, and only those two spacecraft remain. That configuration is shown in FIG. 16.

Preferably, the spacecraft operate independently at all times and do not rely on any inter-spacecraft communications to coordinate their activities. In some embodiments, this may not be desirable. For example, in some embodiments where the spacecraft operate in very close proximity they would need some type of distance/velocity measurement system to determine the separation distance. These measurements would preferably be used in an automatic control system to maintain some prescribed relative trajectory. This automatic control system may use spacecraft to spacecraft communications.

Figure 17:
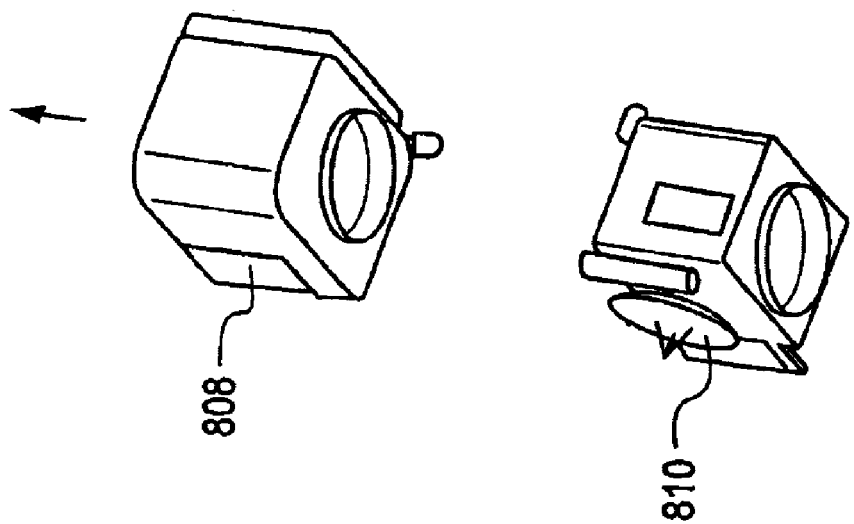
FIG. 17 is a schematic diagram of a preferred embodiment of a pair of separated spacecraft.

The two spacecraft 808 and 810 continue to travel towards the Moon as a connected tandem pair. Eventually, at a predetermined time, the two spacecraft 808 and 810 separate, as shown in FIG. 17. After this separation, the two spacecraft 808 and 810 continue to proceed towards the Moon as two separate spacecraft. This separation gives ahead spacecraft 808 a first trajectory and gives behind spacecraft 810 a second, different trajectory. This difference in trajectory is used to subject ahead spacecraft 808 to different gravitational forces of the Moon than behind spacecraft 810.

Figure 18:
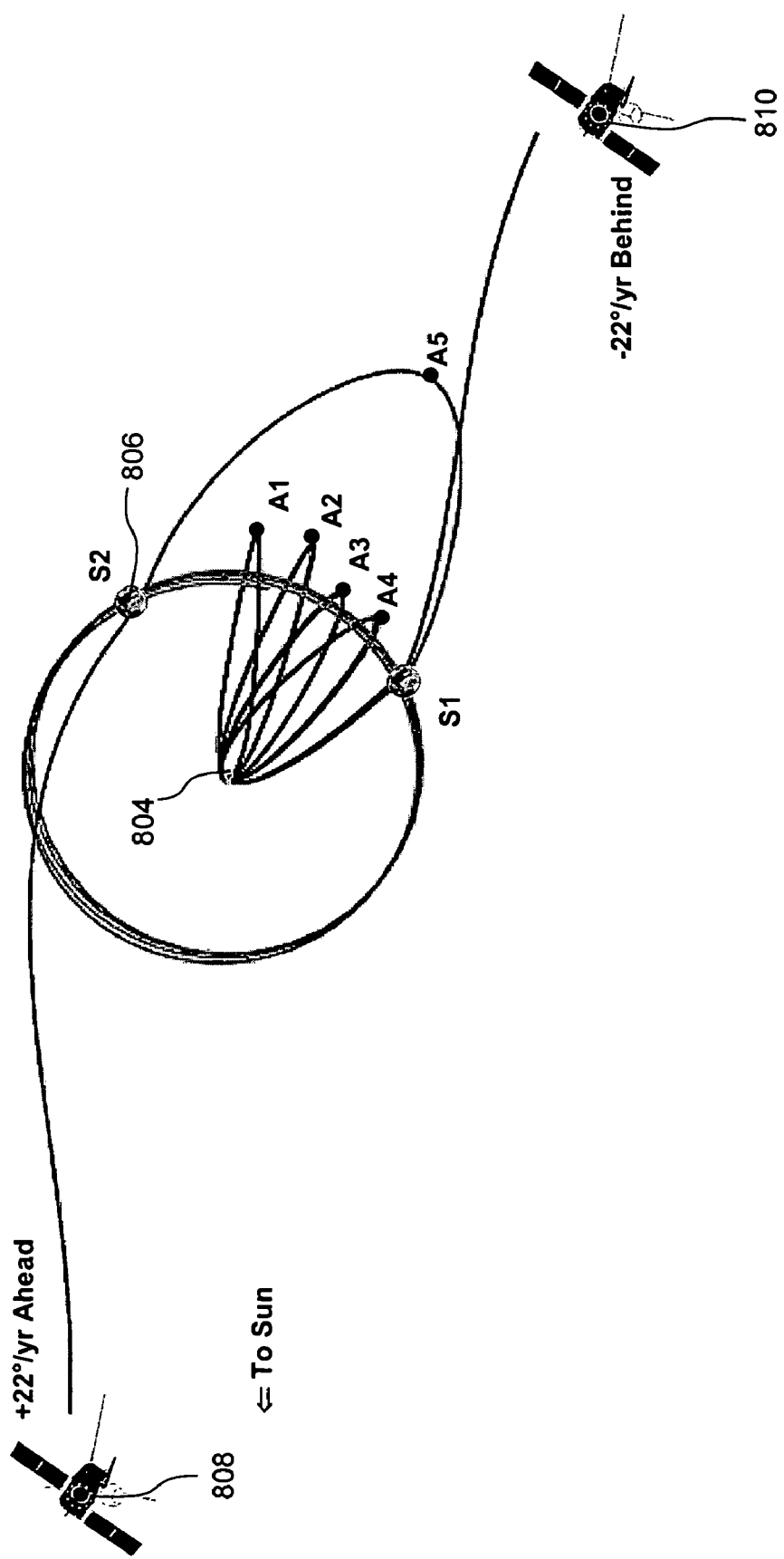
FIG. 18 is a schematic diagram of a preferred embodiment of a mission plan.

FIG. 18 is a schematic diagram of a preferred embodiment of a mission plan. FIG. 19 is a preferred embodiment of a table corresponding to FIG. 18. Principles and features of this mission plan can be used to deploy two spacecraft in heliocentric orbit, one spacecraft "ahead" of Earth and one spacecraft "behind" Earth. In the context of this mission, the term "ahead" means that the spacecraft is in an orbit circumferentially forward of Earth's orbit around the Sun. The term "behind" means that the spacecraft is in an orbit circumferentially rearward of Earth's orbit around the Sun. Separated ahead spacecraft 808 and behind spacecraft 810 are preferably employed to accomplish the mission plan disclosed in connection with FIGS. 18 and 19.

Referring to FIGS. 18 and 19, a 3-stage Delta-II from CCAFS is a suitable spaceship for the launch profile for this mission plan and a launch date in November of 2005 is suitable for this mission. In an exemplary embodiment, a launch date of Nov. 14, 2005 is used.

After coasting in a low Earth parking orbit, the injection into the high-energy phasing orbit is accomplished by restarting the 2nd stage motor to initiate the transfer that is completed by firing the 3rd stage solid rocket motor. The deployment sequence begins shortly after the burn-out of the Delta's 3rd stage solid rocket motor. The entire 3rd stage-spacecraft stack is de-spun from an initial spin rate near 60 revolutions per minute (rpm) to approximately 0.0 rpm using a yo-yo device.

Following the separation of ahead spacecraft 808 with behind spacecraft 810 (see FIG. 17), the spacecraft can each release their solar arrays and continue to drift apart until they are in view of a Deep Space Network (DSN) ground station.

Once in view of a ground station, the spacecraft will then activate their attitude control systems to dump any excess momentum and achieve a sun-pointing attitude.

As shown in FIG. 18, the nominal trajectory design has 4 complete revolutions A1, A2, A3 and A4 prior to the first lunar flyby. These revolutions are referred to as phasing orbits and these phasing orbits allow time for efficiently correcting the trajectory to obtain the desired conditions at the first lunar flyby. By using 4 revolutions, a two-week launch window can be maintained each month. The first lunar encounter, S1 is designed to occur 4.9 days prior to Full Moon.

S1 occurs 55 days from launch for the first day of the launch opportunity window. This time is reduced to 42 days for the last day of the window. Although the time of the lunar flyby is not tightly constrained, the same Sun-Earth-Moon geometry is desired at S1 to optimize the mission orbit. In order to keep the Sun-Earth-Moon geometry constant over the entire launch period the orbital period of the first two phasing orbit revolutions is reduced by about a half a day each day as the launch date proceeds through the launch period.

The initial orbit period is selected to achieve a constant spacecraft-Earth-Moon geometry at the second perigee, P2 (see FIG. 19). Since more than one month elapses from launch until S1, the spacecraft avoid any deleterious lunar perturbations by arriving at P2 while the Moon transits the region near the apogee of the phasing orbit.

At P2 a deterministic maneuver is performed to change the initial orbit period of 7.8-14.2 days to 11.7 days and achieve a lunar gravity assist at S1. The ΔV magnitudes for the maneuvers for ahead spacecraft 808 and behind spacecraft 810 are slightly different in order to adjust the individual trajectories to different aim-points at S1. Further refinement of the individual aim-points is accomplished with a deterministic maneuver following the 3rd apogee, A3. An additional deterministic maneuver is required at the first or second apogee to keep the perigee altitude of P1 (see FIG. 19) or P2 above 500 km with the exception of the first day of the launch opportunity period. On this day the lunar perturbations during the first phasing orbit raise the perigee significantly above the 500 km constraint.

The total ΔV budget for the mission is 182 m/sec. This includes an allocation for the deterministic maneuvers required to maintain the launch opportunity period in addition to non-deterministic trajectory correction maneuvers. The trajectory correction maneuvers accommodate launch dispersions, orbit determination uncertainties, and maneuver execution errors.

The second lunar flyby, S2 is only performed by ahead spacecraft 808. S2 occurs approximately 37 days after S1. The phasing orbit segment from S1 to S2 is referred to as an outer-loop. The Sun-Earth-Moon geometry at the first flyby is selected to optimize the position of both lunar flybys in order to minimize the eccentricity of the solar orbits for both spacecraft. The 1-month outer-loop segment allows the commissioning of the two spacecraft for full science operations in heliocentric orbit to be done sequentially.

The final mission orbit is established by proper selection of the lunar flyby sequence. No subsequent orbit adjustments are required following the final lunar flyby for the spacecraft. This allows nearly continuous observation of the Sun with only minimal interruptions for spacecraft housekeeping and instrument calibration activities.

Figure 21:
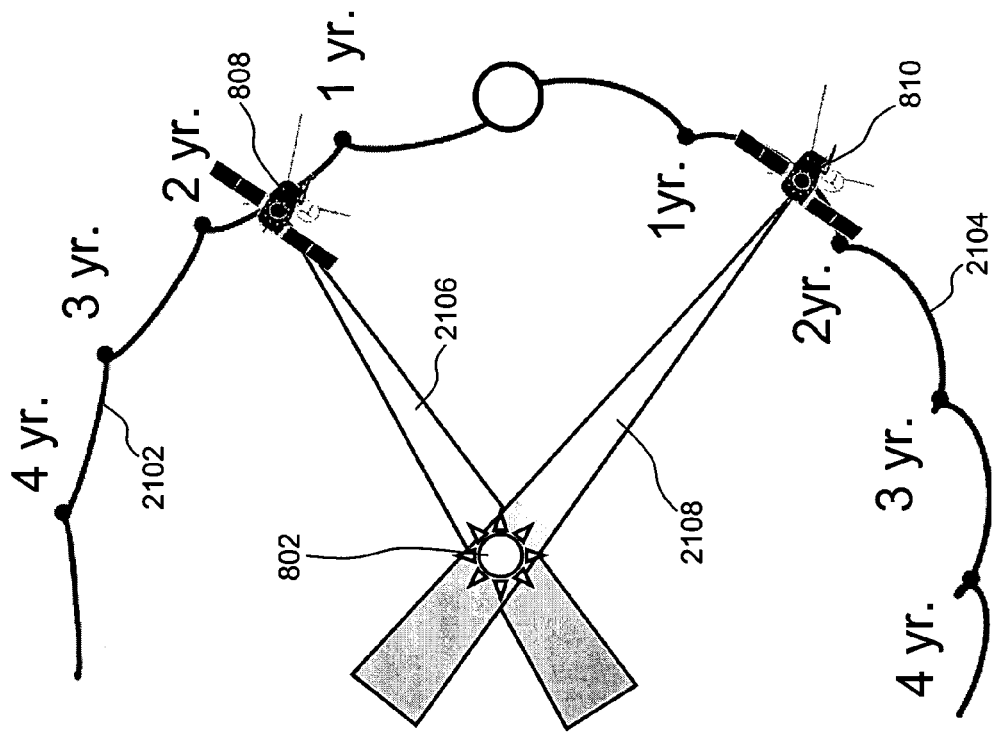
FIG. 21 is a schematic diagram of a preferred embodiment of relative positions of spacecraft with respect to the Earth.
Figure 20:
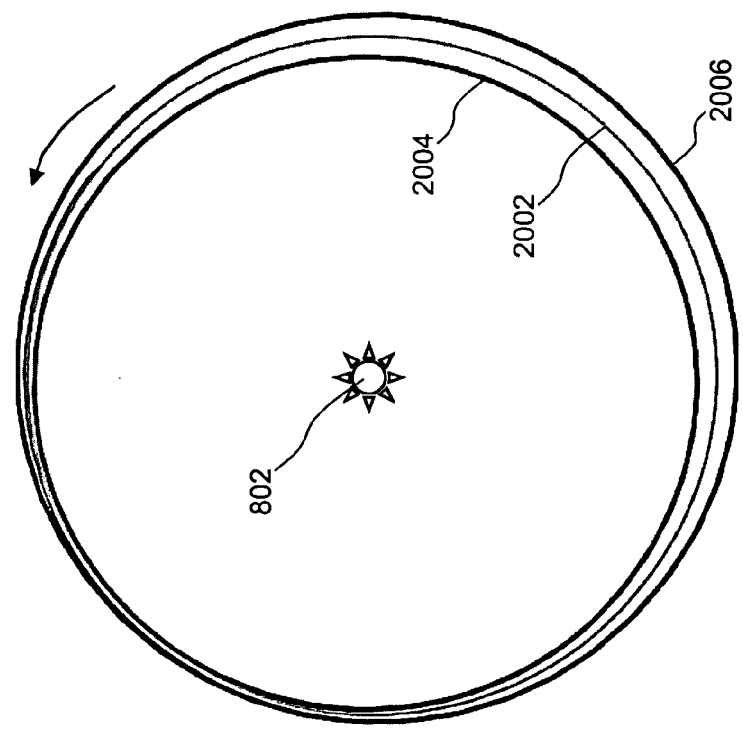
FIG. 20 is a schematic diagram of a preferred embodiment of orbits about the Sun.

After both spacecraft have followed their assigned mission plans, they arrive at their final orbits. FIGS. 20 and 21 are schematic diagrams of a preferred embodiment of a final mission orbit for ahead spacecraft 808 and behind spacecraft 810. Ahead spacecraft 808 is slowed down and assumes a smaller orbit 2004 about Sun 802 than Earth orbit 2002. Behind spacecraft 810 is sped up and assumes a larger orbit 2006 about Sun 802 than Earth orbit 2002.

FIG. 21 is a schematic diagram showing the relative positions of ahead spacecraft 808 and behind spacecraft 810 through the years of their service life. Ahead spacecraft 808 moves ahead of Earth 804 approximately 22° per year along ahead path 2102. Behind spacecraft 810 moves behind or trails Earth by approximately 22° per year along behind path 2104. As shown in FIG. 21, ahead spacecraft 808 is about 22° ahead of Earth after the first year and behind spacecraft 810 is behind Earth about 22°. In year 2, ahead spacecraft 808 is about 44° ahead of Earth and behind spacecraft 810 trails behind Earth 804 about 44°. In year 3, ahead spacecraft 808 is about 66° ahead of Earth and behind spacecraft 810 trails behind Earth 804 about 66°. The two spacecraft continue to separate from each other and from Earth 804 at about the same rate in subsequent years.

This deployment strategy provides a pair of spacecraft that are on opposite sides of Earth 804 with different views or lines of sight to Sun 802. The two spacecraft 808 and 810 can be advantageously configured as solar observatories. Ahead spacecraft 808 has a first view 2106 of Sun 802 and behind spacecraft 810 has a second view 2108 of Sun 802. These different views 2106 and 2108 provide virtual binocular vision of Sun 802. This vision allows for enhanced three dimensional perception of Sun 802.

The actual design condition is the angular rate, which is defined by the Mean Drift Rate. Since the angular rates are the same, the resulting angular displacement at any time is also equal.

Different embodiments can have different angular displacements. The present invention contemplates different angular displacements (rates) so that different types of formations can be created and those different formations can evolve differently over time.

A number of other alternative flyby sequences are possible to achieve the mission orbit. For instance, the outer-loop segment duration could be increased by an integer number of months to increase the time between the spacecraft departures from the Earth-Moon system.

One alternate design places S1 4.9 days prior to New Moon instead of Full Moon. In this sequence the order of the spacecraft departures is reversed. The leading spacecraft Ahead performs a single lunar gravity assist; while the trailing space spacecraft Behind uses two gravity assists. This sequence is equivalent to the nominal sequence with the exception of the lighting conditions in the orbit. In the nominal design for November 2005 the spacecraft is never eclipsed by the Earth. The alternate design is rotated 180° with respect to the Sun-Earth line. The result is an eclipse during each perigee passage. The duration of the eclipse events is approximately 30 minutes.

At other times during the year a non-eclipsing orbit, like the one for November 2005, that satisfies all the mission constraints is not always achievable for the S1 prior to Full Moon. For these launch opportunities the alternate departure sequence is preferable. Therefore, the spacecraft is designed to accommodate the eclipses and use the departure sequence with S1 prior to New Moon.

The lunar gravity assisted deployment of the spacecraft configured as solar observatories provides a cost-effective and efficient solution for establishing an optimal heliocentric formation.

In an exemplary embodiment, principles, features and teachings of the present invention can be used to design a Solar-TErrestrial Relations Observatory (STEREO) mission that can permit the three-dimensional observation of solar objects including three dimensional tracking of Coronal Mass Ejections (CME).

Each of the various components, steps or features disclosed can be used alone or with other components, steps or features. Each of the components, steps or features can be considered discrete and independent building blocks. In some cases, combinations of the components, steps or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A method for deploying a plurality of spacecraft about a first celestial body comprising the steps of:
   (a) storing a first spacecraft and a second spacecraft aboard a spaceship;
   (b) launching, at a launch time within a launch window, the spaceship from a second celestial body that orbits the first celestial body;
   (c) flying the spaceship towards a third celestial body that orbits the second celestial body;
   (d) separating the first spacecraft and the second spacecraft from the spaceship while the spaceship is traveling towards the third celestial body;
   (e) separating the first spacecraft from the second spacecraft while the spaceship is traveling towards the third celestial body;
   (f) establishing a first trajectory for the first spacecraft leading to a first spacecraft flyby past the third celestial body, the first trajectory including multiple orbits about the second celestial body during which orbit period corrections are made to account for the time of launch in step (b), such that after the multiple orbits the first spacecraft flyby will coincide with a predetermined first-second-third celestial body orbital geometry regardless of the launch time within the launch window;
   (g) establishing a second trajectory for the second spacecraft leading to a second spacecraft flyby past the third celestial body, the second trajectory including multiple orbits about the second celestial body during which orbit period corrections are made to account for the time of launch in step (b), such that after the multiple orbits of the second trajectory the second spacecraft flyby will coincide with the predetermined first-second-third celestial body orbital geometry regardless of the launch time within the launch window, wherein the first trajectory is different than the second trajectory;
   (h) performing the first spacecraft flyby, including subjecting the first spacecraft to a gravitational force of the third celestial body whereby the first trajectory of the first spacecraft is modified and the first spacecraft assumes a first orbit about the first celestial body;
   (i) performing the second spacecraft flyby, including subjecting the second spacecraft to the gravitational force of the third celestial body whereby the second trajectory of the second spacecraft is modified and the second spacecraft assumes a second orbit about the first celestial body; and
   wherein the first orbit is different from the second orbit and the first and second spacecraft are positioned on opposite sides of the second body.

2. The method according to claim 1, further comprising the step of subjecting the second spacecraft to the gravitational field of the third celestial body a second time.

3. The method of claim 2, wherein steps (g) and (i) cause the second spacecraft to traverse an orbit outer-loop segment that is outside an orbit of the third celestial body around the second celestial body in preparation for subjecting the second spacecraft to the gravitational field of the third celestial body a second time.

4. The method according to claim 1, wherein the first orbit is circumferentially ahead of an orbit of the second celestial body.

5. The method according to claim 1, wherein the second orbit is circumferentially behind an orbit of the second celestial body.

6. The method according to claim 1, wherein an N number of spacecraft are stored aboard the spaceship.

7. The method according to claim 1, wherein the first orbit is smaller than an orbit of the second celestial body.

8. The method according to claim 1, wherein the second orbit is larger than an orbit of the second celestial body.

9. The method according to claim 1, wherein an angular displacement of the first spacecraft from the second celestial body is approximately equal to an angular displacement of the second spacecraft from the second celestial body.

10. The method of claim 1, wherein:
    step (f) comprises maneuvering the first spacecraft at perigee and apogee positions of the multiple orbits of the first spacecraft to make the orbit period corrections thereof; and
    step (g) comprises maneuvering the second spacecraft at perigee and apogee positions of the multiple orbits of the second spacecraft to make the orbit period corrections thereof.

11. The method of claim 1, wherein steps (f), (g), (h) and (i) together cause an eccentricity of the first and second orbits about the first celestial body to be minimized.

12. The method of claim 1, wherein the first celestial body is the sun, the second celestial body is the earth, and the third celestial body is the moon.

* * * * *